(12) United States Patent
Schmitt et al.

(10) Patent No.: US 9,522,989 B2
(45) Date of Patent: Dec. 20, 2016

(54) SOLVENTS FOR FLUOROPOLYMERS

(75) Inventors: Paul-Guillaume Schmitt, Lescar (FR);
Melanie Vauthrin, Denguin (FR)

(73) Assignee: ARKEMA FRANCE, Colombes (FR)

( * ) Notice: Subject to any disclaimer, the term of this patent is extended or adjusted under 35 U.S.C. 154(b) by 142 days.

(21) Appl. No.: 14/123,916

(22) PCT Filed: Jun. 5, 2012

(86) PCT No.: PCT/FR2012/051248
§ 371 (c)(1),
(2), (4) Date: Dec. 4, 2013

(87) PCT Pub. No.: WO2012/168641
PCT Pub. Date: Dec. 13, 2012

(65) Prior Publication Data
US 2014/0100313 A1 Apr. 10, 2014

(30) Foreign Application Priority Data

Jun. 6, 2011 (FR) .................................. 11 54907

(51) Int. Cl.
*C08K 5/41* (2006.01)
*C08K 5/07* (2006.01)
*C09D 7/00* (2006.01)
*C09D 127/16* (2006.01)
*C08J 3/07* (2006.01)

(52) U.S. Cl.
CPC .. *C08K 5/41* (2013.01); *C08J 3/07* (2013.01); *C08K 5/07* (2013.01); *C09D 127/16* (2013.01); *C08J 2327/12* (2013.01); *C08J 2327/16* (2013.01)

(58) Field of Classification Search
CPC ............... C08K 5/41; C08K 5/07; C09D 7/00; C09D 127/16
USPC ........................................ 524/173; 106/311
See application file for complete search history.

(56) References Cited

U.S. PATENT DOCUMENTS

| 2,955,095 | A | * | 10/1960 | Gollob | C08G 18/10 |
| | | | | | 252/8.61 |
| 3,006,715 | A | * | 10/1961 | Lyman | C08J 3/091 |
| | | | | | 264/206 |
| 3,468,994 | A | * | 9/1969 | Gilbert | B65D 65/42 |
| | | | | | 106/311 |
| 4,772,440 | A | | 9/1988 | Kasi et al. | |
| 5,387,378 | A | * | 2/1995 | Pintauro | B01D 61/362 |
| | | | | | 264/41 |
| 5,929,005 | A | * | 7/1999 | Smith | C11D 3/046 |
| | | | | | 134/38 |
| 6,123,850 | A | | 9/2000 | Commarieu et al. | |
| 6,235,198 | B1 | | 5/2001 | Commarieu et al. | |
| 8,076,519 | B2 | | 12/2011 | Schmitt | |
| 2006/0052268 | A1 | * | 3/2006 | Artuphel | B08B 3/08 |
| | | | | | 510/411 |

FOREIGN PATENT DOCUMENTS

| DE | 22 17 375 | A1 | | 11/1973 | |
| EP | 0 223 709 | A2 | | 5/1987 | |
| EP | 0 574 957 | B1 | | 12/1993 | |
| EP | 0 639 106 | B1 | | 2/1995 | |
| EP | 0 878 454 | B1 | | 11/1998 | |
| EP | 0 878 466 | B1 | | 11/1998 | |
| FR | 2 285 227 | | | 4/1976 | |
| FR | 2 850 114 | A1 | | 7/2004 | |
| GB | 1 395 729 | A | | 5/1975 | |
| GB | 1395729 | A | * | 5/1975 | ............ B31D 3/02 |
| GB | 1 492 328 | | | 11/1977 | |
| WO | 97/19047 | | | 5/1997 | |
| WO | 2011/012820 | A1 | | 2/2011 | |

* cited by examiner

*Primary Examiner* — Ling Choi
*Assistant Examiner* — Ronald Grinsted
(74) *Attorney, Agent, or Firm* — Smith, Gambrell & Russell, LLP

(57) ABSTRACT

The invention relates to a solvent system for fluoropolymer comprising from 50 to 99.9% by weight of a composition (A) comprising dimethyl sulphoxide, and from 0.1 to 50% by weight of a composition (B) comprising at least one ketone.
The invention also relates to the solutions comprising the said solvent system and the said fluoropolymer, and to their uses in the manufacture of films, membranes and coatings.

27 Claims, No Drawings

SOLVENTS FOR FLUOROPOLYMERS

The present invention relates to the field of solvents for fluoropolymers and to the use of the said dissolved fluoropolymers in the preparation of films, membranes, coatings and others.

Fluoropolymers are today very widely used for their mechanical and chemical strength properties and their long lifespans. In fact, the polymers are increasingly used in increasingly numerous applications.

The commonest among these applications are those where the fluoropolymers are formed into films, membranes or coatings. As a general rule, fluoropolymers have entirely advantageous applications when they are in the form of films, which may or may not be supported, the thickness of which varies from a few tens of manometers to several millimeters.

Thus, as nonlimiting examples, fluoropolymers are used in the manufacture of films, membranes and coatings or in the manufacture of batteries, such as batteries of Li-ion type.

In such applications, the fluoropolymers have first of all to be dissolved in more or less concentrated solutions, the films subsequently being produced by removing the solvent or solvents, for example by evaporation or by extraction using a third solvent, or any other method known to a person skilled in the art.

Fluoropolymers, in particular poly(vinylidene fluoride)s, better known under the name of PVDFs, are today commonly dissolved in N-methyl-2-pyrrolidone (NMP). Although it is appropriate for the forming of fluoropolymers, NMP however exhibits many disadvantages. This is because NMP is a compound having a high toxicological risk, it being from now on classified as reprotoxic. There is therefore an advantage in replacing NMP with solvents having a better toxicological profile.

DMSO (or dimethyl sulphoxide) is a known solvent which makes it possible to dissolve certain grades of PVDF, such as, for example, the Kynar® and Kynar Flex® products sold by Arkema or also the Solef®, Hylar®, Halar® or Hyflon® products sold by Solvay. The use of DMSO makes it possible to obtain solutions with viscosities comparable to those obtained with NMP. However, in order to make possible this dissolution, the DMSO has to be heated to a temperature of the order of 50° C., indeed even greater.

In addition, the solution of PVDF in DMSO thus prepared is not stable over time: gelling or cloudiness of the solution is often observed after only from 1 to 2 days. The users are consequently restricted to rapidly using and applying the solution in order to produce the required films, which constitutes a curb on the replacement of NMP.

Patent Application FR 2 285 227 describes a process for assembling PVDF parts by adhesive bonding, the adhesive being a dilute solution of PVDF in a solvent, it being possible for the said solvent to be chosen from dimethylformamide (DMF), N,N-dimethylacetamide (DMAC), tetrahydrofuran (THF), dimethyl sulphoxide (DMSO), cyclohexanone (CyHone), hexamethylphosphoramide (HMPA), butyrolactone and their mixtures. An example effectively shows that PVDF can be dissolved in DMF but at a temperature of 60° C.

Patent EP 0 639 106 B1 teaches the preparation of membranes using solvent/cosolvent mixtures which make it possible to dissolve PVDFs at any temperature. Although many possible mixtures are provided, it clearly emerges from this teaching that only the mixtures based on NMP and on DMF or on n-butylacetate are effective and are the only ones to be described in examples.

Patent Application EP 0 223 709 A2 also describes a process for the preparation of porous membranes by dissolution of a fluoropolymer in a solvent. The solvents suitable for this process are chosen from ketones, ethers, amides and sulphoxides, and their mixtures. The best solvent is shown to be the acetone/DMF mixture, which is confirmed by the examples, which only illustrate just this mixture of solvents. In addition, these examples teach that the dissolution has to be carried out under hot conditions and that the polymer solution has to be used immediately.

U.S. Pat. No. 5,367,378 also describes a process for the preparation of membranes from fluoropolymers which are dissolved beforehand in a mixture consisting of a solvent with a high boiling point and of a solvent with a low boiling point. Mention is made, as examples of such mixtures of solvents, of the mixtures of acetone and of another solvent chosen from DMF, DMAC, DMSO and their mixtures.

The examples of U.S. Pat. No. 5,387,378 present only dissolutions of fluoropolymers in an acetone/DMAC mixture, where the acetone is always in a predominant proportion with respect to the DMAC. In addition, the mixture has to be heated at 50° C. for an hour before the formation of the film proper.

Patent EP 0 574 957 B1 describes composite acrylonitrile/PVDF membranes which can be used in separation operations. The constituent polymers of the membranes can be dissolved in a solvent chosen from NMP, DMF, DMSO, HMPA, DMAC, dioxane and their mixtures, optionally in the presence of cosolvents chosen from acetone, methanol, ethanol, formamide, water, methyl ethyl ketone and others. The examples presented show only polyacrylonitrile (PAN) membranes and their good resistances to attacks by solvents, such as NMP, DMF, DMSO, toluene, methyl ethyl ketone, acetone and others.

Thus, among all the techniques known today of the prior art, none of them is satisfactory as none of them can compel recognition as a technique where the solvent systems for fluoropolymers can advantageously replace the reference solvent, which is NMP.

This is because the techniques described in the prior art show that the dissolution of the fluoropolymers in the solvent system has to be carried out under hot conditions, that is to say at a temperature of at least 50° C.

The techniques of the prior art also teach that the solutions obtained have to be used rapidly after preparation, a person skilled in the art thus understanding that the solutions obtained are not stable over time, or are not stable when they are cooled to ambient temperature or to the temperature at which the solution of fluoropolymers is formed.

In addition, the techniques of the prior art do not appear to be concerned with the problem of the viscosities of the solutions obtained, which nevertheless is of very great importance for the forming of the fluoropolymers and which is one of the reasons why NMP is widely used today. This is because the solutions of fluoropolymers in NMP exhibit low viscosities, making it possible to obtain solutions having a high content of polymers and thus to use less solvent for the preparation of films.

Thus, one of the objectives of the present invention is to provide a solvent system for fluoropolymers which does not exhibit the abovementioned disadvantages encountered in the prior art.

More specifically, a first objective of the present invention is to provide a solvent system for fluoropolymers which is less toxic than NMP, in particular weakly toxic, indeed even nontoxic.

Another objective is to provide a solvent system for fluoropolymers which does not require heating the solution, or at the very least heating to a temperature of the order of, indeed even less than, 50° C., and preferably makes possible the dissolution of the said fluoropolymers at ambient temperature.

Yet another objective is to provide a solvent system for fluoropolymers which results in solutions which are stable over time that is to say solutions for which the stability over time is similar to that obtained with solutions in NMP, and generally more stable than with the known solvents of the prior art, such as NMP, DMSO, ketones, DMAC and others.

Yet another objective is to provide a solvent system for fluoropolymers resulting in polymer solutions for which the viscosity is similar to the viscosity of solutions of fluoropolymers in NMP and generally for which the viscosity is substantially lower than the viscosity of the solutions obtained with the solvents used in the techniques of the prior art.

It has now been discovered that the abovementioned objectives can be achieved, in all or at least in part, by virtue of the solvent system of the present invention. Yet other objectives which can be achieved by virtue of the subject-matters of the present invention will become apparent in the description which follows.

According to a first aspect, the present invention relates to a DMSO-based solvent system which makes it possible to dissolve fluoropolymers without having to heat at high temperatures, to obtain solutions for which the viscosities are lower than those obtained with DMSO alone, and to obtain solutions of fluoropolymers which are much more stable over time than with DMSO and comparable to NMP. Another advantage of the solvent system according to the invention is that it confers, on the solutions of fluoropolymers, a lower crystallization point than that of pure DMSO, that is to say of less than approximately 18° C.

More specifically, the present invention relates to a solvent system for fluoropolymer comprising:

from 50 to 99.9% by weight of a composition (A) comprising dimethyl sulphoxide (DMSO), and
from 0.1 to 50% by weight of a composition (B) comprising at least one ketone.

This is because it has been discovered, surprisingly, that the DMSO-based solvent systems according to the invention, although comprising an amount of less than or equal to 50% by weight of ketone(s), make it possible to obtain solutions of fluoropolymers which are stable over time and for which the viscosity is entirely comparable to the viscosity values of the solutions of fluoropolymers in the known solvents of the prior art, in particular, solutions in NMP.

Thus, the fluoropolymers (or fluororesins) which can be dissolved in the solvent system according to the present invention can be of any type known to a person skilled in the art and in particular fluorinated and/or chlorofluorinated homopolymers and copolymers, such as, for example, those sold by Arkema under the Kynar® and Kynar Flex® names, for example Kynar® 761, those sold by Solvay under the Solexis® name (homo- and copolymers obtained by suspension polymerization), under the Solef® name, such as, for example, the homopolymers 1010, 1012, 1013, 1015, 6008, 6010, 6012, 6013, 6020 and 5130, the PVDF-HFP copolymers 11008, 11010, 21508 and 21216, or the PVDE-CTFE copolymers 31008, 31508 and 32008, under the Hylar® name (homo- and copolymers by emulsion polymerization, Hylar® 451), ECTFE (ethylene/chlorotrifluoroethylene) copolymers sold under the Halar® name, and the perfluoroionomers Hyflon® E79, E87 and D83, and others, to mention only some of them, without implied limitation.

The solvent system according to the present invention is particularly well suited to the dissolution of fluororesins comprising at least one poly(vinylidene fluoride) homopolymer and/or copolymer, denoted PVDF in the continuation.

The solvent system of the present invention comprises an amount of greater than or equal to 50% by weight of a DMSO-based composition (A). According to one embodiment, the composition (A) comprises DMSO alone. DMSO alone or more simply DMSO is understood to mean a composition (A) comprising more than 80% by weight, preferably more than 90% by weight and more preferably more than 95% by weight of DMSO, it being possible for the remainder to consist of the impurities inherent in the manufacture of DMSO, after optional purification (as described in WO 1997/019047, EP 0 878 454 and EP 0 878 466), and/or of odorous agents (as described in WO 2011/012820), and/or any other additive known to a person skilled in the art, such as, for example and without implied limitation, chosen from stabilizers, including UV stabilizers, colourants, preservatives, biocides and others.

According to another embodiment, the composition (A) can comprise, in addition to the DMSO, one or more other solvents for the fluoropolymer other than a ketone. Advantageously, the other solvent or solvents of the composition (A) are added with the aim of lowering the crystallization point of the DMSO. Such solvents can be chosen from those known to a person skilled in the art and in particular from esters, diesters, and entirely preferably from propylene carbonate, dimethyl carbonate, diethyl succinate, dimethyl adipate, dimethyl glutarate, and their mixtures, these diesters being better known under the generic term of DBE (DiBasic Esters). Rhodia sells some of these DBEs, in particular dimethyl glutarate under the trade name Rhodiasolv Iris®. Dupont/Invista also sells DBEs having variable compositions of dimethyl succinate, dimethyl adipate and dimethyl glutarate under the names DBE-2, DBE-3, DBE-4, DBE-5, DBE-6 and DBE-9.

The amount of solvent(s) present in the composition (A) with the DMSO is generally between 0 and 50% by weight, preferably between 0 and 40% by weight and more preferably between 0 and 30% by weight, with respect to the total weight of the composition (A), the remainder to 100% consisting of the DMSO, alone or in combination with the impurities, odorous agents and/or other additives described above.

The composition (B) for its part comprises at least one ketone which will be of any type known to a person skilled in the art, preferably at least one aliphatic, cycloaliphatic or aromatic ketone, and the mixtures of two or more of these ketones. Preferably, the ketones included in the composition (B) are chosen from linear or branched aliphatic and/or cycloaliphatic ketones and, for example, without implied limitation, the ketones are chosen from dimethyl ketone (or acetone), diethyl ketone, methyl ethyl ketone, methyl isobutyl ketone, optionally substituted cyclohexanone, for example trimethylcyclohexanone (TMCHONE), cyclopentanone, and others, and the mixtures of two or more of these ketones in all proportions.

Very surprisingly, the addition of at least one ketone to the DMSO makes it possible to observe nonlinear results, that is to say better than those observed during the dissolution of fluoropolymers in DMSO only or in just a ketone, the said results being understood in terms of viscosity and of stability over time.

In one embodiment of the invention, preference is given to a ketone or a mixture of ketones having a boiling point close to that of DMSO, more specifically close to that of the composition (A), or also to a ketone or a mixture of ketones forming an azeotrope with DMSO or with the composition (A). In this preferred embodiment, the removal of the solvent system for the fluoropolymer in which it is dissolved will be facilitated, it being possible for the composition (A) and the composition (B) thus to be simultaneously removed by heating, evaporation and others.

Another advantage related to the similar or identical boiling points of the composition (A) and the composition (B) or else related to the formation of an azeotrope between the composition (A) and the composition (B) is their ease of purification, and recycling.

Acetone, cyclohexanone and trimethylcyclohexanone are particularly suitable and effective as composition (B) in the solvent system of the present invention and confer, on the solutions of fluoropolymers, an excellent stability on storage ranging up to 2, 3 or indeed even several weeks. In addition, trimethylcyclohexanone has a boiling point very close to that of DMSO.

In the solvent system of the present invention, the composition (B) represents from 0.1 to 50% by weight of the total weight of the solvent system, the remainder to 100% being represented by the composition (A) defined above. Preferably, the composition (B) represents from 0.1 to 25% by weight, more preferably from 0.1 to 20% by weight and entirely preferably from 0.1 to 15% by weight of the total weight of the solvent system according to the present invention.

According to a preferred embodiment of the present invention, the solvent system for fluoropolymers comprises:
a. from 70 to 95% by weight of DMSO, for example approximately 75% by weight, and
b. from 5 to 30% by weight of at least one ketone chosen from cyclohexanone, trimethylcyclohexanone and their mixtures in all proportions, for example approximately 25% by weight.

According to another preferred embodiment, the solvent system for fluoropolymers according to the invention comprises:
a. from 85 to 99% by weight of DMSO, for example approximately 95% by weight, and
b. from 1 to 15% by weight of acetone, for example approximately 5% by weight.

According to yet another preferred embodiment, the solvent system for fluoropolymers of the present invention comprises:
a. from 85 to 99% by weight, preferably approximately 95% by weight, of a mixture of 50% by weight of DMSO with 50% by weight of DBE, preferably dimethyl glutarate, and
b. from 1 to 15% by weight of acetone, preferably approximately 5% by weight.

According to yet another preferred embodiment of the present invention, the solvent system for fluoropolymers comprises;
a. from 70 to 95% by weight, for example approximately 75% by weight, of a mixture of 50% by weight of DMSO with 50% by weight of DBE, preferably dimethyl glutarate, and
b. from 5 to 30% by weight, of at least one ketone chosen from cyclohexanone, trimethylcyclohexanone and their mixtures in all proportions, preferably approximately 25% by weight.

The solvent systems of the present invention as just defined in addition exhibit the advantage of being able to dissolve the fluoropolymers, in particular poly(vinylidene fluoride)s, at a lower temperature than that required when the dissolution is carried out in DMSO alone, it even being possible for this dissolution to be carried out in some cases, according to the nature of the fluoropolymer and the nature of the solvent system, at ambient temperature.

Yet another advantage lies in the fact that the solvent system according to the invention confers, on the solutions of fluoropolymers, a relatively low viscosity, that is to say lower than that observed when the only solvent is DMSO. By virtue of this advantage, it is possible to dissolve higher contents of fluoropolymers than with just NMP or just DMSO, or also to dissolve fluoropolymers having a higher molar mass.

Thus, and according to another aspect, the invention relates to the use of at least one solvent system as defined above for the dissolution of fluoropolymers, in particular poly(vinylidene fluoride).

According to yet another aspect, the present invention relates to the process for the dissolution of fluoropolymer, in particular PVDF, comprising at least the stage of bringing the said fluoropolymer into contact with at least one solvent system as defined above.

This contacting operation is preferably carried out with stirring, at ambient temperature or at a temperature between ambient temperature and 80° C., preferably between ambient temperature and 60° C., more preferably between ambient temperature and 50° C. The fluoropolymer can be brought into contact with at least one solvent system according to the invention in any form but, for reasons of speed or dissolution, it is preferable for the said fluoropolymer to be in a powder form.

The solvent system according to the present invention is entirely suitable for the dissolution of fluoropolymers, in particular of PVDFs. In other words, the solvent system of the invention makes it possible to obtain solutions of fluoropolymers which are clear and stable over time.

The amount of fluoropolymer(s) which can be dissolved in the solvent system of the invention varies within large proportions, according to the nature of the polymer and the nature of the solvent system, and is generally between 1 and 50% by weight, preferably between 1 and 40% by weight and more preferably between 1 and 25% by weight, for example approximately 10% by weight, of fluoropolymer, with respect to the total weight of fluoropolymer+solvent system final solution.

According to another aspect, the present invention relates to a solution comprising:
a. from 1 to 50% by weight, preferably from 1 to 40% by weight and more preferably from 1 to 25% by weight, for example approximately 10% by weight, of at least one fluoropolymer, preferably at least one PVDF, and
b. from 50 to 99% by weight, preferably from 60 to 99% by weight and more preferably from 75 to 99% by weight, for example approximately 90% by weight, of at least one solvent system as defined above.

As indicated above, fluororesins, in particular PVDFs, are well known today for their excellent chemical resistance, their noteworthy mechanical properties and their excellent stability over time. All these qualities make them materials of choice for the uses thereof as membranes for filtration and ultrafiltration and for the manufacture of batteries, to mention only some of their applications.

Fluororesins, in particular PVDFs, due to their solubility in the solvent system of the present invention, can thus easily be formed by moulding in a solvent medium according to the phase inversion (solvent casting) process or can also be prepared in the form of sheets, fibres, hollow fibres, pipes and others.

The invention also relates to the use of the solvent system for fluoropolymer as defined above or a solution of fluoropolymer in the solvent system as defined above in the manufacture of films, membranes and coatings.

The fields of application comprise the treatment of drinking water and waste water, filtration of blood and proteins, the preparation of water of very high purity, medical diagnostics, and the filtrations involved in chemical processes, in particular when an exceptional chemical resistance is required.

In addition, some PVDF resins, such as, for example, Kynar® resins, are approved for contact with food, which makes them a material of choice in the field of filtration in the food processing industry and of the drinks industry. High density PVDF membranes, in particular Kynar® membranes, can be used for the separation of solvents by pervaporation. Microporous PVDF membranes, in particular Kynar® membranes, can be used as substrate material for the preparation of membranes made of composite polymer.

PVDF membranes, in particular Kynar® and Kynar Flex® membranes, are also known to be used in the manufacture of batteries with a high charge density. The solvent, system of the present invention thus makes possible in particular the dissolution of fluororesins, in particular PVDF resins, especially Kynar® and Kynar Flex® resins, in the manufacture of batteries or Li-ion/polymer and lithium with liquid electrolyte type, it being possible for the solvent system to be evaporated by any system known to a person skilled in the art, for example by heating.

For the preparation of batteries, the solvent system of the invention can comprise, in addition to the fluororesin or fluororesins, any type of additive and filler normally employed in the synthesis of the said batteries, in particular carbon, whether in the form of charcoal, active charcoal, or alternatively in the form of carbon nanotubes (CNTs).

The present invention is now illustrated by means of the examples which follow and which under no circumstances limit the scope of the protection as requested in the appended claims.

EXAMPLE 1

Tests of dissolution of Kynar® 761 PVDF from Arkema were carried out with NMP, DMSO, a DMSO/TMCHONE (70%/30% by weight) mixture, a DMSO/TMCHONE (50%/50% by weight) mixture, a DMSO/TMCHONE (30%/70% by weight) mixture and TMCHONE alone.

10% by weight of Kynar® 761 are introduced into the test solvent. The mixture is heated at 50° C. with gentle stirring.

After a few minutes, the Kynar® 761 has completely dissolved, except in the case of the 30%/70% by weight DMSO/TMCHONE mixture, and a transparent solution is obtained for all these solvents. The solutions are allowed to return to ambient temperature.

The viscosities of the solutions of dissolved Kynar® 761 are then characterized at 30° C. on a Brookfield cone-plate viscometer. The results observed are collated in the following Table 1:

TABLE 1

| Content of Kynar® 761 | Solvent used | Viscosity (cP) |
| --- | --- | --- |
| 10% by weight | NMP | 250 |
| 10% by weight | DMSO | 323 |
| 10% by weight | DMSO/TMCHONE (70%/30% by weight) | 260 |
| 10% by weight | DMSO/TMCHONE (50%/50% by weight) | 230 |
| 10% by weight | DMSO/TMCHONE (30%/70% by weight) | Insoluble |
| 10% by weight | TMCHONE | Insoluble |

It is noticed that the addition of ketone to the DMSO, in amounts of less than or equal to 50% by weight, indeed even equal to that of the DMSO, does not harm the solubility of the fluoropolymer and on the contrary favours a decrease in the viscosity, with respect to dissolution in DMSO alone. On the other hand, a greater amount of ketone prevents the fluoropolymer from dissolving.

EXAMPLE 2

The 4 solutions of Example 1 which made it possible to dissolve the Kynar® 761 are left at ambient temperature in order to study their stability over time.

After 7 days, visual analysis of the solutions is carried out and the results are presented in the following Table 2:

TABLE 2

| Content of Kynar® 761 | Solvent used | Appearance after 7 days |
| --- | --- | --- |
| 10% by weight | NMP | Transparent viscous liquid solution |
| 10% by weight | DMSO | Viscous liquid solution but very cloudy |
| 10% by weight | DMSO/TMCHONE (70%/30% by weight) | Transparent viscous liquid solution |
| 10% by weight | DMSO/TMCHONE (50%/50% by weight) | Completely cloudy solid gelled solution |

With time, the unstable solutions change and pass from the transparent liquid state to the cloudy liquid state and then the solid and cloudy gel state. Only the composition of solvents according to the present invention exhibits similar characteristics to NMP as regards the dissolution of fluoropolymers.

In particular, a composition comprising DMSO and TMCHONE in the 70%/30% by weight proportions thus makes it possible to obtain a 10% Kynar® 761 solution which is stable over time, in contrast to a pure DMSO solution or a DMSO/TMCHONE solution with a TMCHONE content of greater than 50% by weight.

EXAMPLE 3

Similarly, tests of dissolution of Kynar® 761 are carried out with a DMSO/TMCHONE (80%/20% by weight) mixture.

10% by weight of Kynar® 761 are introduced into the test solvent. The mixture is heated at 50° C. with gentle stirring.

After a few minutes, the Kynar® 761 has completely dissolved. The solution is allowed to return to ambient temperature and is then left at ambient temperature in order to study its stability over time.

After 21 days, visual analysis of the solution is carried out and the solution is still liquid and transparent.

EXAMPLE 4

Similarly, tests of dissolution of Kynar® 761 are carried out with NMP, DMSO, a DMSO/cyclohexanone (80%/20% by weight) mixture, a DMSO/cyclohexanone (50%/50% by weight) mixture, a DMSO/cyclohexanone (30%/70% by weight) mixture and cyclohexanone alone.

10% by weight of Kynar® 761 are introduced into the test solvent. The mixture is heated at 50° C. with gentle stirring. After a few minutes, the Kynar® 761 has completely dissolved, except in the case of the cyclohexanone alone mixture, and a transparent solution is obtained for all these solvents. The solutions are allowed to return to ambient temperature.

The viscosities of the solutions of dissolved Kynar® 761 are then characterized at 30° C. on a Brookfield cone-plate viscometer. The results observed are collated in the following Table 3:

TABLE 3

| Content of Kynar ® 761 | Solvent used | Viscosity (cP) |
|---|---|---|
| 10% by weight | NMP | 250 |
| 10% by weight | DMSO | 323 |
| 10% by weight | DMSO/cyclohexanone (80%/20% by weight) | 275 |
| 10% by weight | DMSO/cyclohexanone (50%/50% by weight) | 240 |
| 10% by weight | DMSO/cyclohexanone (30%/70% by weight) | 216 |
| 10% by weight | Cyclohexanone | Insoluble |

The solvent compositions according to the invention make it possible to obtain viscosities which are lower than those obtained with DMSO alone and comparable with that of NMP.

EXAMPLE 5

The solutions of Example 4 which made it possible to dissolve Kynar® 761 are left at ambient temperature in order to study their stability over time.

After 3 days, visual analysis of the solutions is carried out and the results are collated in the following Table 4:

TABLE 4

| Content of Kynar ® 761 | Solvent used | Appearance after 3 days |
|---|---|---|
| 10% by weight | NMP | Transparent viscous liquid solution |
| 10% by weight | DMSO | Viscous liquid solution but cloudy |
| 10% by weight | DMSO/cyclohexanone (80%/20% by weight) | Transparent viscous liquid solution |
| 10% by weight | DMSO/cyclohexanone (50%/50% by weight) | Transparent viscous liquid solution |
| 10% by weight | DMSO/cyclohexanone (30%/70% by weight) | Completely cloudy solid gelled solution |

With time, the unstable solutions change and pass from the transparent liquid, state to the cloudy liquid state and then the solid and cloudy gel state. The DMSO/ketone mixtures according to the invention make it possible to obtain a 10% solution of fluoropolymer which is stable over time, in contrast to a pure DMSO solution or a DMSO/ketone solution with ketone contents of greater than 70% by weight. The DMSO/cyclohexanone (80%/20% by weight) solution is still liquid and transparent after 21 days.

EXAMPLE 6

Tests of dissolution of Kynar® 761 are carried out with NMP, DMSO, a DMSO/acetone (95%/5% by weight) mixture, a DMSO/acetone (80%/20% by weight) mixture and acetone alone.

10% by weight of Kynar® 761 are introduced into the test solvent. The mixture is heated at 50° C. with gentle stirring. After a few minutes, the Kynar® 761 has completely dissolved in all these solvents and a transparent solution is obtained for all these solvents. The solutions are allowed to return to ambient temperature.

The viscosities of the solutions of dissolved Kynar® 761 are then characterized at 30° C. on a Brookfield cone-plate viscometer. The results observed are collated in the following Table 5:

TABLE 5

| Content of Kynar ® 761 | Solvent used | Viscosity (cP) |
|---|---|---|
| 10% by weight | NMP | 250 |
| 10% by weight | DMSO | 323 |
| 10% by weight | DMSO/acetone (95%/5% by weight) | 263 |
| 10% by weight | DMSO/acetone (80%/20% by weight) | 120 |
| 10% by weight | Acetone | 10 |

The DMSO/acetone mixtures thus make it possible to obtain much lower viscosities than those obtained with DMSO or NMP alone.

EXAMPLE 7

The 5 solutions of Example 6 are left at ambient temperature in order to study their stability over time. After 3 days, visual analysis of the solutions is carried out. The results observed are collated in the following Table 6:

TABLE 6

| Content of Kynar ® 761 | Solvent used | Appearance after 3 days |
|---|---|---|
| 10% by weight | NMP | Transparent viscous liquid solution |
| 10% by weight | DMSO | Viscous liquid solution but cloudy |
| 10% by weight | DMSO/acetone (95%/5% by weight) | Transparent viscous liquid solution |
| 10% by weight | DMSO/acetone (80%/20% by weight) | Transparent viscous liquid solution |
| 10% by weight | Acetone | Completely cloudy solid gelled solution |

With time, the unstable solutions change from the transparent liquid state to the cloudy liquid state and then the solid and cloudy gel state.

After 10 days, the DMSO/acetone (95%/5%) solution is still stable and has a liquid and transparent appearance. After 45 days, the DMSO/acetone (80%/20%) solution is still stable and has a transparent liquid appearance.

A DMSO/acetone (80%/20% by weight or 95%/5% by weight) mixture thus makes it possible to obtain a 10% Kynar® 761 solution which is stable over time, in contrast to a pure DMSO solution or a pure acetone solution.

EXAMPLE 8

Tests of dissolution of Kynar® 761 are carried out with DMSO, a DMSO/dimethyl glutarate/acetone (66.5%/28.5%/5% by weight) mixture, a DMSO/dimethyl glutarate (70%/30% by weight) mixture and dimethyl glutarate alone.

10% by weight of Kynar® 761 are introduced into the test solvent. The mixture is heated at 50° C. with gentle stirring. After a few minutes, the Kynar® 761 has completely dissolved in all these solvents, except in the case of the dimethyl glutarate alone, and a transparent solution is obtained for all these solvents. The solutions are allowed to return to ambient temperature.

The viscosities of the solutions of dissolved Kynar® 761 are then characterized at 30° C. on a Brookfield cone-plate viscometer. The results observed are collated in the following Table 7:

TABLE 7

| Content of Kynar ® 761 | Solvent used | Viscosity (cP) |
| --- | --- | --- |
| 10% by weight | DMSO | 323 |
| 10% by weight | DMSO/dimethyl glutarate/acetone (66.5%/28.5%/5% by weight) | 278 |
| 10% by weight | DMSO/dimethyl glutarate (70%/30% by weight) | 335 |
| 10% by weight | Dimethyl glutarate | Insoluble at 50° C. |

The DMSO/dimethyl glutarate/acetone mixtures thus make it possible to obtain lower viscosities than those obtained with DMSO alone. Dimethyl glutarate alone does not make it possible to dissolve Kynar® 761 at 50° C. It is necessary to heat to approximately 100° C. in order to achieve this, which is not advantageous.

EXAMPLE 9

The 3 solutions of Example 8 which made it possible to dissolve Kynar® 761 are left at ambient temperature in order to study their stability over time.

After 7 days, visual analysis of the solutions is carried out. The results observed are collated in the following Table 8:

TABLE 8

| Content of Kynar ® 761 | Solvent used | Appearance after 7 days |
| --- | --- | --- |
| 10% by weight | DMSO | Viscous liquid solution but cloudy |
| 10% by weight | DMSO/dimethyl glutarate/acetone (66.5%/28.5%/5% by weight) | Transparent viscous liquid solution |
| 10% by weight | DMSO/dimethyl glutarate (70%/30% by weight) | Completely cloudy gelled solid solution |

A DMSO/dimethyl glutarate/acetone (66.5%/28.5%/5% by weight) mixture thus makes it possible to obtain a 10% Kynar® 761 solution which is stable over time, in contrast to a pure DMSO solution or a pure dimethyl glutarate solution.

The invention claimed is:

1. Solvent system for fluoropolymers comprising:
   from 50 to 99.9% by weight, with respect to the total weight of the solvent system, of a composition (A) comprising dimethyl sulphoxide (DMSO), and
   from 0.1 to 50% by weight, with respect to the total weight of the solvent system, of a composition (B) comprising at least one ketone, and
   wherein the combination of composition (A) and composition (B) provides a solvent system for dissolving the fluoropolymers.

2. Solvent system according to claim 1, wherein the solvent system is one that dissolves fluoropolymers chosen from fluorinated and/or chlorofluorinated homopolymers and copolymers obtained by suspension or emulsion polymerization, ECTFE (ethylene/chlorotrifluoroethylene) copolymers, perfluoroionomers, or fluororesins comprising at least one poly(vinylidene fluoride) homopolymer and/or copolymer.

3. Solvent system according to claim 1, wherein the composition (A) comprises, in addition to the DMSO, one or more other solvents for the fluoropolymer other than a ketone.

4. Solvent system according to claim 3, wherein the other solvent or solvents for the fluoropolymer other than a ketone is (are) selected from the group consisting of esters, diesters, and their mixtures.

5. Solvent system according to claim 3, wherein the amount of solvent(s) present in the composition (A) with the DMSO is between 0 and 50% by weight, with respect to the total weight of the composition (A), the remainder to 100% consisting of the DMSO, alone or in combination with impurities, odorous agents and/or other additives.

6. Solvent system according to claim 1, wherein the at least one ketone included in the composition (B) is chosen from linear or branched aliphatic and/or cycloaliphatic ketones or mixtures of two or more of these ketones in all proportions.

7. Solvent system according to claim 1, comprising:
   a. from 70 to 95% by weight, with respect to the total weight of the solvent system, of DMSO, and
   b. from 5 to 30% by weight, with respect to the total weight of the solvent system, of at least one ketone chosen from cyclohexanone, trimethylcyclohexanone, or their mixtures in all proportions.

8. Solvent system according to claim 1, comprising:
   c. from 85 to 99% by weight, with respect to the total weight of the solvent system, of DMSO, and
   d. from 1 to 15% by weight, with respect to the total weight of the solvent system, of acetone.

9. Solvent system according to claim 1, comprising:
   e. from 85 to 99% by weight, with respect to the total weight of the solvent system, of a mixture of 50% by weight of DMSO with 50% by weight of DBE, and
   f. from 1 to 15% by weight, with respect to the total weight of the solvent system, of acetone.

10. Solvent system according to claim 1, comprising:
   g. from 70 to 95% by weight, with respect to the total weight of the solvent system, of a mixture of 50% by weight of DMSO with 50% by weight of DBE, and
   h. from 5 to 30% by weight, with respect to the total weight of the solvent system, of at least one ketone chosen from cyclohexanone, trimethylcyclohexanone, or their mixtures in all proportions.

11. A method of making a solvent system according to claim 1, comprising bringing together:
   from 50 to 99.9% by weight of a composition (A) comprising dimethyl sulphoxide (DMSO), and
   from 0.1 to 50% by weight of a composition (B) comprising at least one ketone.

12. Process for the dissolution of fluoropolymer, in particular poly(vinylidene fluoride), comprising at least the stage of bringing the said fluoropolymer into contact with at least one solvent system according to claim 1.

13. Solution comprising:
   i. from 1 to 50% by weight, preferably from 1 to 40% by weight and more preferably from 1 to 25% by weight of at least one fluoropolymer, preferably at least one poly(vinylidene fluoride), and
   j. from 50 to 99% by weight, preferably from 60 to 99% by weight and more preferably from 75 to 99% by weight of at least one solvent system according to claim 1.

14. A method of forming a film, membrane, coating, or battery component, comprising forming the film, membrane, coating or battery component with a dissolved fluoropolymer which is dissolved by the solvent system according to claim 1.

15. A method of manufacturing a battery, comprising introducing a battery component formed of a dissolved fluoropolymer which is dissolved by the solvent system according to claim 1 to a battery support.

16. The solvent system of claim 4, wherein the other solvent or solvents for the fluoropolymer other than a ketone is (are) selected from the group consisting of propylene carbonate, diethyl carbonate, dimethyl succinate, dimethyl adipate, dimethyl glutarate, and mixtures thereof.

17. The solvent system of claim 5, wherein the amount of solvent(s) present in the composition (A) with the DMSO is between 0 and 40% by weight, with respect to the total weight of the composition (A).

18. The solvent system of claim 5, wherein the amount of solvent(s) present in the composition (A) with the DMSO is between 0 and 30% by weight, with respect to the total weight of the composition (A).

19. The solvent system of claim 6, wherein the at least one ketone included in the composition (B) is selected from the group consisting of dimethyl ketone, diethyl ketone, methyl ethyl ketone, methyl isobutyl ketone, cyclohexanone that may be optionally substituted, trimethylcyclohexanone (TMCHONE), cyclopentanone, and the mixtures of two or more of these ketones in all proportions.

20. The solvent system of claim 7, comprising: approximately 75% by weight, with respect to the total weight of the solvent system, of DMSO and approximately 25% by weight, with respect to the total weight of the solvent system, of at least one ketone chosen from cyclohexanone, trimethylcyclohexanone, or their mixtures in all proportions.

21. The solvent system of claim 8, comprising: approximately 95% by weight, with respect to the total weight of the solvent system, of DMSO and approximately 5% by weight, with respect to the total weight of the solvent system, of acetone.

22. The solvent system of claim 9, comprising: approximately 95% by weight, with respect to the total weight of the solvent system, of a mixture of 50% by weight of DMSO with 50% by weight of DBE, and approximately 5% by weight, with respect to the total weight of the solvent system, of acetone.

23. The solvent system of claim 9, wherein the DBE is dimethyl glutarate.

24. The solvent system of claim 10, comprising: approximately 75% by weight, with respect to the total weight of the solvent system, of a mixture of 50% by weight of DMSO with 50% by weight of DBE, and approximately 25% by weight, with respect to the total weight of the solvent system, of at least one ketone chosen from cyclohexanone, trimethylcyclohexanone, or their mixtures in all proportions.

25. The solvent system of claim 1, which dissolves the fluoropolymer at a temperature below 50° C.

26. The solvent system of claim 25, which dissolves poly(vinylidene fluoride) as the fluoropolymer or as a component of the fluoropolymer.

27. The solvent system of claim 25, which dissolves the fluoropolymer at ambient temperature.

* * * * *